UNITED STATES PATENT OFFICE.

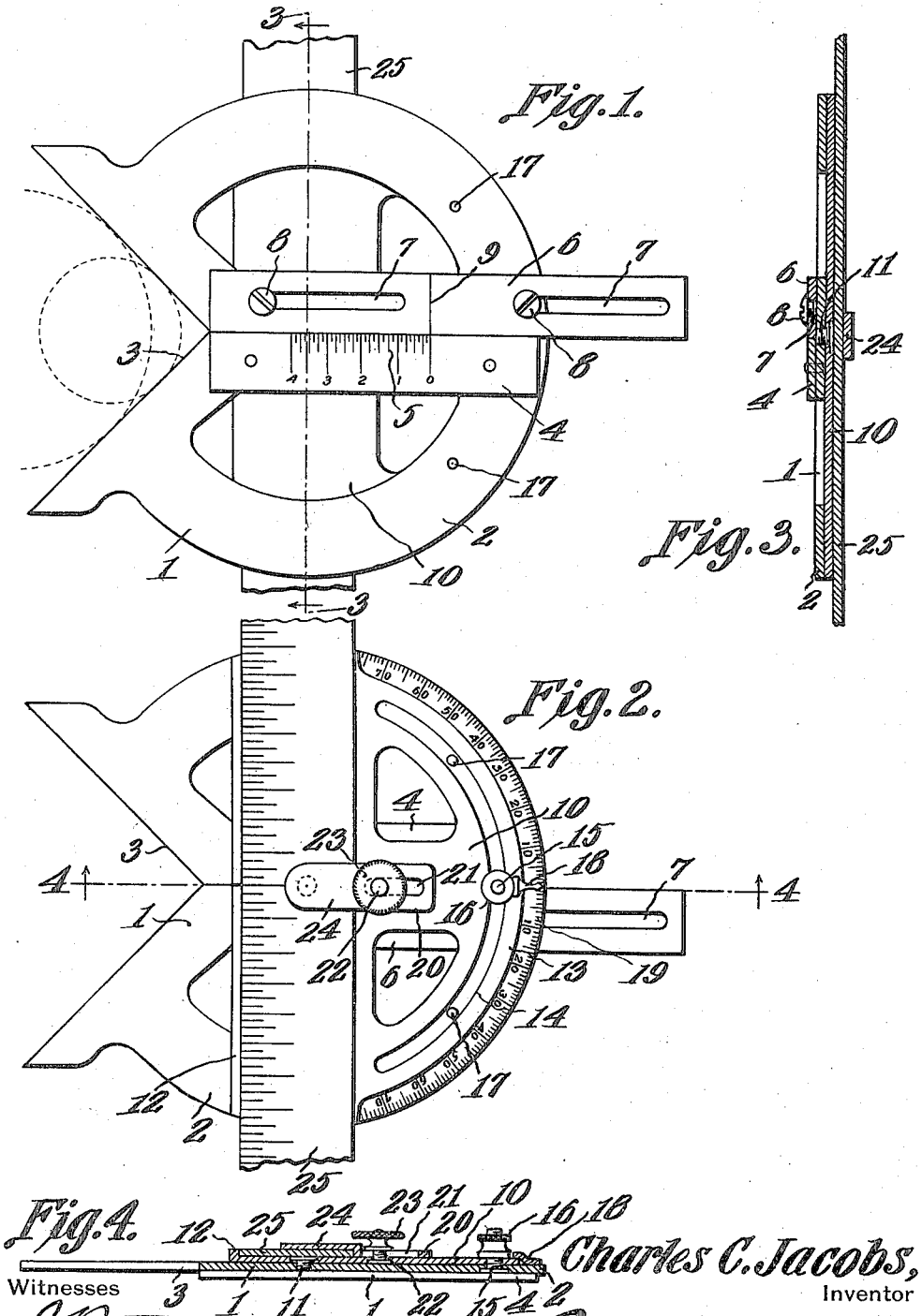

CHARLES C. JACOBS, OF AKRON, OHIO.

COMBINATION CENTERING AND MEASURING INSTRUMENT.

1,164,353.  Specification of Letters Patent.  Patented Dec. 14, 1915.

Application filed February 18, 1914, Serial No. 819,478. Renewed May 24, 1915. Serial No. 30,230.

*To all whom it may concern:*

Be it known that I, CHARLES C. JACOBS, a citizen of the United States, residing at Akron, in the county of Summit and State of Ohio, have invented a new and useful Combination Centering and Measuring Instrument, of which the following is a specification.

The present invention appertains to measuring instruments, and aims to provide a novel and improved tool or instrument of that nature.

It is the object of the present invention to provide an instrument of unique construction, whereby the same may be employed for readily determining the diameters, radii, weight per unit lengths, or other data with respect to various cylindrical or circular objects.

Another object of the present invention is to provide a device of the nature indicated, which may also be employed as a centering medium for shafts, and various other cylindrical or circular objects.

A further object of the present invention is to provide an instrument of the character specified, which may be utilized as a height and depth gage, and as an angle gage.

It is also within the scope of the present invention, to provide an instrument for the purposes above intimated, which shall be comparatively simple, compact, substantial and inexpensive in construction, as well as being simple, convenient, practical, serviceable and efficient in its use.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention has been illustrated in its preferred embodiment in the accompanying drawing, wherein:—

Figure 1 is a front view of the improved instrument, portions of the blade or beam being broken away. Fig. 2 is a back or rear view of the instrument, portions of the blade or beam being broken away. Fig. 3 is a sectional view taken on the line 3—3 of Fig. 1. Fig. 4 is a sectional view taken on the line 4—4 of Fig. 2.

In carrying out the present invention, the instrument embodies a frame or body 1, which is preferably stamped or fashioned from suitable sheet metal, and which comprises a circular or arcuate rim portion 2 extending through an arch of 270 degrees and having at its end portions, a reëntrant angle portion 3, the arms or blade portions of which are preferably disposed at right angles with respect to one another.

Riveted or otherwise secured to the face or one side of the body or base 1, is a strip or cleat 4, which has one edge suitably graduated as at 5, and arranged on a line bisecting the angle defined by the arms of the angle portion 3. The graduations or scale 5 may be of any suitable character, according to the nature of the work to be accomplished by the instrument, as will be apparent to the skilled mechanic, the graduations reading upward from zero toward the corner of the angle portion 3.

A gage or measuring strip or member 6 is slidably mounted upon the body or frame 1, adjoining the cleat 4, one edge of the gage strip 6 slidably engaging the graduated or fiducial edge of the cleat 4, so as to lie on the line bisecting the angle portion 3. The gage strip 6 is relatively long, and is provided with longitudinal slots 7 adjoining its ends, through which guide and retaining screws 8 pass, to take into the body or plate 1, to retain the gage strip 6 in place, and to permit the same to have limited sliding movements along the graduated cleat 4, whereby that end of the gage strip 6 adjoining the angle portion 3, may be projected beyond the corner of the angle portion, or may be retracted so as to lie upon or adjacent the said elbow or corner. It will be observed that the cleat 4 also assists in guiding the gage strip 6 for rectilinear or reciprocatory movements, the gage strip 6 being provided with a "scratch" or pointer 9 cooperable with the graduations 5, to indicate upon the graduations, certain functions as will hereinafter more fully appear.

The present invention further includes a somewhat semi-circular plate 10 resting snugly or flatly against the back of the body or frame 1, and pivoted to the center portion of the body 1 by means of a counter sunk pivot screw 11, to permit the body 1 and plate 10 to oscillate or rotate with respect to one another. The plate 10 is provided with a curved edge 13 spaced inwardly slightly from the curved edge of the body 1, and curved about the pivot 11 as a center. Opposite the curved edge 13, the plate 10 is provided with a straight chordal flange or lip 12 turned away from the body or frame 1. The flange or lip 12 preferably is so arranged, as to fall upon or aline with the respective edges of the blade or jaws of the angle portion 3, when the body 1 and plate 10 are properly set or swung relative to each other.

The plate is provided with a curved or arcuate slot 14 adjacent the curved edge 13, and a counter sunk bolt 15 engages through the body 1, through the slot 14, and bears a binding or clamping nut 16 arranged to seat or contact with the plate 10 over the slot 14, to clamp the plate 10 at any adjusted position with respect to the body. The bolt 15 is preferably disposed upon the line which intersects the angle portion 3, but the body or plate 1 is provided with supplemental bolt holes or apertures 17, for the reception of the bolt 15, should it be desired to change the position of the bolt when circumstances necessitate or require.

A pointer 18 is carried by the curved edge 13 of the plate 10 and coöperates with a scale of protractor graduations 19 inscribed or otherwise provided upon the curved edge portion of the body or plate 1 at the back of the said body. The graduations 19 are intended to indicate the angularity of the plate 10 with respect to the body 1, as will be obvious.

A clamp or holding member or strip 20 is carried by the central portion of the plate 10, the strip 20 having a longitudinal slot 21 at one end, through which a bolt 22 is passed, the bolt having a flat head engaged through and countersunk within the plate 10 adjacent the pivot 11, or at that side of the pivot, opposite to the flange or lip 12, as seen in Fig. 4. A binding or clamping nut 23 is threaded upon the free end of the bolt 22 to clamp the strip 20 at any adjusted position, the said strip being adjustable to and from the clamp or lip 12, when the nut 23 is loosened. The end of the strip 20 having the slot 21, is disposed remote from the flange or lip 12, while the other end 24, is offset away from the plate 10, to receive therein under, a blade 25 of a combination square, or a graduated beam of any suitable character. Thus, one edge of the blade or beam 25 is designed to rest against the flange or lip 12, while the other edge engages under the clamp or holding member 20, the clamp 20 being readily adjusted snugly against the last mentioned edge of the blade or beam 25, in order that when the nut 25 is tightened, the blade or beam will be firmly held in place upon the blade 10.

The present instrument may be employed in divers capacities. Thus, it may be employed for laying out work upon a table, in various manners as will be obvious to the artisan, from the character of the instrument. The instrument may be conveniently employed for determining the diameter, radius, weight per unit length, or other data concerning the shaft, pipe or the like. To this end, the graduations 5 are preferably set, so as to indicate, directly, or through the medium of proper constants, the diameter, radius, circumference, weight, or the like, of a cylindrical object to which the instrument is applied in a manner which will be presently amplified.

To determine the diameter, radius, circumference, or other data respecting a cylindrical object, such as a shaft the angle portion 3 is applied to the shaft, indicated in dotted lines in Fig. 1 and the gage strip 6 is then moved or slid toward and against the shaft, in which event, the scratch or pointer 9 will indicate upon the scale or graduations 5, the diameter, radius, or other information desired. The scratch or pointer 9 is arranged so as to aline with the zero graduations of the scale 5, when the end of the gage strip 6 adjoining the angle portion 3 lies directly upon the elbow or corner of the said angle portion. Thus, when the angle portion 3 is applied to a shaft or other circular object, of relatively small diameter, the space between the elbow or corner of the angle portion 3 and the shaft will be relatively small, while when the angle portion 3 is applied to a shaft or cylindrical member of relatively large diameter, the space between the shaft and the elbow or angle portion 3, will be of increased proportions. In this manner, when the attachment is applied to objects of various diameters, the movement of the gage strip 6 toward and against the various objects will be proportional directly to the diameters of the objects, whereby the diameters or other data concerning the objects, will be properly indicated upon the scale 5.

The scale 5 may be graduated, to indicate either the diameters of the objects, or the radii, circumference or the like, or the scale 5 may be graduated to indicate the weight per unit length of the shafts or other objects to which the angle portion 3 is applied. It is also possible to employ in connection with the scale 5, certain constants for use in connection with the indications upon the scales to determine the information desired.

It is to be noted that one edge of the gage strip 6 lies upon the line bisecting the angle portion 3, in order that the said edge of the gage strip 6 may move along one diameter of the shaft or other object, to and from the center of the shaft, whereby the shaft may be readily centered through the medium of the present instrument.

The improved instrument may also be employed as a height or depth gage, or the like, by applying the blade 25 of a combination square, or any other suitable graduated rule or beam, to the carrier plate 10 in the manner above described, and as illustrated in the drawing.

It will be noted that the blade or beam 25 may be readily applied to and detached from the carrier plate 10.

In using the instrument as a height or depth gage, or the like, the plate 10 and body 1 are so adjusted with respect to one another, as to bring the blade 25 at right angles to the line intersecting the angle portion 3, this being readily accomplished through the medium of the pointer 18 carried by the plate 10 and the graduations 19 upon the body 1. The plate 10 may be clamped against the body through the medium of the bolt 15 and nut 16 as indicated. Then, when the nut 23 is loosened, the body 1 together with the plate 10 may be slid longitudinally along the blade 25 in order that when the angle portion 3 is applied to a shaft or other object, there will be indicated upon the graduations of the blade or tongue 25, the distance of the center of the shaft or other object, from the end of the blade 25, which may be seated against the floor, or other object, from which the measurement is to be taken.

It will be obvious that the present instrument may readily be employed as a height or depth gage, without further description being necessary. The present instrument may also be employed as an angle gage, by adjusting the carrier plate 10 and the body 1 with respect to one another, in order that the angularity of the angle portion 3 with respect to the blade or beam 25, may be indicated upon the graduations 19 by the pointer 18. For example, supposing a certain indication upon the scale of the blade 25, is not in alinement with the center of the shaft or object, the body or plate 1 may be adjusted or oscillated, in order that the angle portion 3 may properly engage the shaft, and at the same time, the angularity of the body or plate 1 may be indicated upon the scale 19, to indicate the angle in which the center of the shaft lies with respect to the predetermined graduation or indication upon the blade or beam 25.

In view of the foregoing, taken in connection with the drawing, the other advantages and capabilities of the present invention will be obvious to those versed in the art to which the present invention relates, it being noted that the objects aimed at have been carried out satisfactorily.

Having thus described the invention, what I claim as new is:—

1. In a measuring instrument, the combination of a body having an angle portion, a carrier plate pivoted to one side of the body and having a lip turned away from the body, and a clamp carried by the carrier plate and coöperating with the said lip for receiving and holding a blade, the body and carrier plate having a coöperating scale and pointer.

2. In a measuring instrument, the combination of a body plate having an angle portion, a carrier plate pivoted to one side of the body plate and having a lip turned away from the body plate, and a clamp having one end portion adjustably mounted upon the carrier plate and having its other end portion offset and coöperating with the said lip to receive and hold a blade, and the body and carrier plate having a coöperating scale and pointer.

In testimony that I claim the foregoing as my own, I have hereto affixed my signature in the presence of two witnesses.

CHARLES C. JACOBS.

Witnesses:
H. C. SPICER,
MARTHA HUGGLER.